United States Patent
Uchida et al.

(10) Patent No.: US 10,830,862 B2
(45) Date of Patent: Nov. 10, 2020

(54) POSITION MEASURING SYSTEM INCLUDING A SERVER AND A PLURALITY OF BEACONS

(71) Applicant: TOSHIBA TEC KABUSHIKI KAISHA, Tokyo (JP)

(72) Inventors: Shigeo Uchida, Mishima Shizuoka (JP); Akihiko Fujiwara, Kawasaki Kanagawa (JP); Kenji Ito, Ota Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 374 days.

(21) Appl. No.: 15/869,608

(22) Filed: Jan. 12, 2018

(65) Prior Publication Data
US 2018/0275243 A1    Sep. 27, 2018

(30) Foreign Application Priority Data
Mar. 24, 2017  (JP) .................................. 2017-059894

(51) Int. Cl.
*G01S 5/02*    (2010.01)
(52) U.S. Cl.
CPC ............. *G01S 5/021* (2013.01); *G01S 5/02* (2013.01); *G01S 5/0226* (2013.01);
(Continued)
(58) Field of Classification Search
CPC .............................. G01S 5/0036; G01S 5/021
See application file for complete search history.

(56) References Cited

U.S. PATENT DOCUMENTS 7,283,093 B2 * 10/2007  Do .......................... G01S 1/024
                                                            342/386
8,929,243 B2    1/2015  Kurata et al.
(Continued)

FOREIGN PATENT DOCUMENTS

JP    2017-055344    3/2017
WO    2016/174396 A1    11/2016

OTHER PUBLICATIONS

Yalamanchili, Ashok. "Automatic Detection of iBeacon Failure Using Raspberry Pi." https://dzone.com/articles/automatic-detection-ibeacon-0. Apr. 2015 (Year: 2015).*
(Continued)

*Primary Examiner* — Gregory C. Issing
(74) *Attorney, Agent, or Firm* — Kim & Stewart LLP

(57) ABSTRACT

A position measuring system includes s server and radio wave emitting stations positioned at different locations across a position measuring area. A storage device stores, for each of the plurality of radio wave emitting stations, a beacon identifier that uniquely identifies the radio wave emitting station and a first threshold time. A processor receives, from a portable device, reception information including a reception time indicating when the portable device received a signal from one of the radio wave emitting stations. The processor determines, based on the received signal strength identifier, a position of the reception station in the position measuring area. The processor determines an operation state of the radio wave emitting station corresponding to the received signal. A display device displays information indicating the determined operation state of each of the plurality of radio wave emitting stations.

20 Claims, 12 Drawing Sheets

(52) U.S. Cl.
CPC .......... *G01S 5/0236* (2013.01); *G01S 5/0242* (2013.01); *G01S 5/0252* (2013.01)

(56) References Cited

U.S. PATENT DOCUMENTS

| | | | |
|---|---|---|---|
| 9,820,092 B1 | 11/2017 | Fujiwara et al. | |
| 10,321,265 B2* | 6/2019 | Gerken, III | H04W 4/023 |
| 2003/0146835 A1* | 8/2003 | Carter | G01S 5/0036 |
| | | | 340/539.13 |
| 2009/0042585 A1 | 2/2009 | Matsuda | |
| 2013/0217332 A1* | 8/2013 | Altman | H04H 60/90 |
| | | | 455/41.2 |
| 2015/0105098 A1 | 4/2015 | Sridhara et al. | |
| 2015/0181384 A1* | 6/2015 | Mayor | H04W 24/02 |
| | | | 455/456.1 |
| 2015/0308835 A1 | 10/2015 | Hansen et al. | |

OTHER PUBLICATIONS

Extended European Search Report dated Aug. 21, 2018 in corresponding European Patent Application No. 18157315.5, 9 pages.

\* cited by examiner

FIG. 5

| BEACON IDENTIFIER | MAP IMAGE | INSTALLATION COORDINATES | TIME THRESHOLD VALUE | POSITIONING SYSTEM | BEACON SET AS NEIGHBORING BEACON | MALFUNCTION DETERMINATION |
|---|---|---|---|---|---|---|
| B00 | NORTH BUILDING FIRST FLOOR | 220,400 | T1 | ONE-POINT POSITIONING | | ○ |
| B01 | NORTH BUILDING FIRST FLOOR | 215,370 | T3 | TWO-POINT POSITIONING | B02 | × |
| B02 | NORTH BUILDING FIRST FLOOR | 230,300 | T2 | TWO-POINT POSITIONING | B01,B05 | ○ |
| B03 | NORTH BUILDING FIRST FLOOR | 270,450 | T3 | TWO-POINT POSITIONING | B04 | ○ |
| B04 | NORTH BUILDING FIRST FLOOR | 290,390 | T2 | TWO-POINT POSITIONING | B03,B05 | ○ |
| B05 | NORTH BUILDING FIRST FLOOR | 290,360 | T2 | TWO-POINT POSITIONING | B02,B04,B06 | ○ |
| B06 | NORTH BUILDING FIRST FLOOR | 300,280 | T3 | TWO-POINT POSITIONING | B05 | ○ |
| B07 | NORTH BUILDING SECOND FLOOR | 20,30 | T4 | THREE-POINT POSITIONING | | ○ |
| B08 | NORTH BUILDING SECOND FLOOR | 50,60 | T4 | THREE-POINT POSITIONING | | ○ |

POSITION MEASURING SYSTEM INCLUDING A SERVER AND A PLURALITY OF BEACONS

CROSS-REFERENCE TO RELATED APPLICATION

This application is based upon and claims the benefit of priority from Japanese Patent Application No. 2017-059894, filed Mar. 24, 2017, the entire contents of which are incorporated herein by reference.

FIELD

Embodiments described herein relate generally to a position measuring system that measures the position of a portable device by using a plurality of radio wave emitting stations such as beacons.

BACKGROUND

A position measuring device measures the position of a mobile device which moves with a person or object inside a manufacturing facility (a plant), a store, or the like by using a radio communication technology is known. The position measuring device measures the reception strength at the mobile device that received radio waves emitted from a radio wave emitting station (a radio terminal), for example, and calculates the distance between the mobile device and the radio wave emitting station based on the measured value. Then, the position measuring device identifies the position of the mobile device based on the information on the distance between one or more than one radio wave emitting station and the mobile device.

In general, when the area in which the position of the mobile device is to be identified is large, a plurality of radio wave emitting stations are arranged so that the mobile device can receive the radio waves from at least one radio wave emitting station in that area. Checking whether or not the radio wave emitting station is operating for maintenance thereof requires physically moving close to the radio wave emitting station to check whether or not a signal therefrom can be received by using a signal reception terminal. No problem arises if the number of radio wave emitting stations is small and the radio wave emitting stations are installed physically close to one another. However, if the number of radio wave emitting stations is increased or the radio wave emitting stations are installed far from each other, checking the operation status of each of the radio wave emitting stations by using the signal reception terminal is difficult.

DESCRIPTION OF THE DRAWINGS

FIG. 5 is a diagram depicting an example of a data table for managing a plurality of beacon terminals disposed in the position measurement object area;

DETAILED DESCRIPTION

Embodiments provide a position measuring device, which can easily check the operation of a radio wave emitting station, and an operation check program.

A server according to an embodiment is provided for use in a position measuring system that includes the server and a plurality of radio wave emitting stations positioned at different locations across a position measuring area. The server includes a communication interface configured to communicate with a portable device that is moved through the position measuring area. A storage device stores, for each of the plurality of radio wave emitting stations, a beacon identifier that uniquely identifies the radio wave emitting station and a first threshold time. A processor receives, from the portable device via the communication interface, reception information including: a reception time indicating when the portable device received a signal from one of the plurality of radio wave emitting stations, a received signal strength identifier indicating a strength of the signal received by the portable device, and a beacon identifier corresponding to the received signal. The processor determines, based on the received signal strength identifier, a position of the reception station in the position measuring area. The processor determines an operation state of the radio wave emitting station corresponding to the received signal based on whether a difference between the reception time and a current time exceeds the first threshold time stored with respect to the radio wave emitting station corresponding to the beacon identifier included in the received reception information. A display device displays information indicating the determined operation state of each of the plurality of radio wave emitting stations.

Hereinafter, an embodiment will be described with reference to the drawings.

Figure 1:
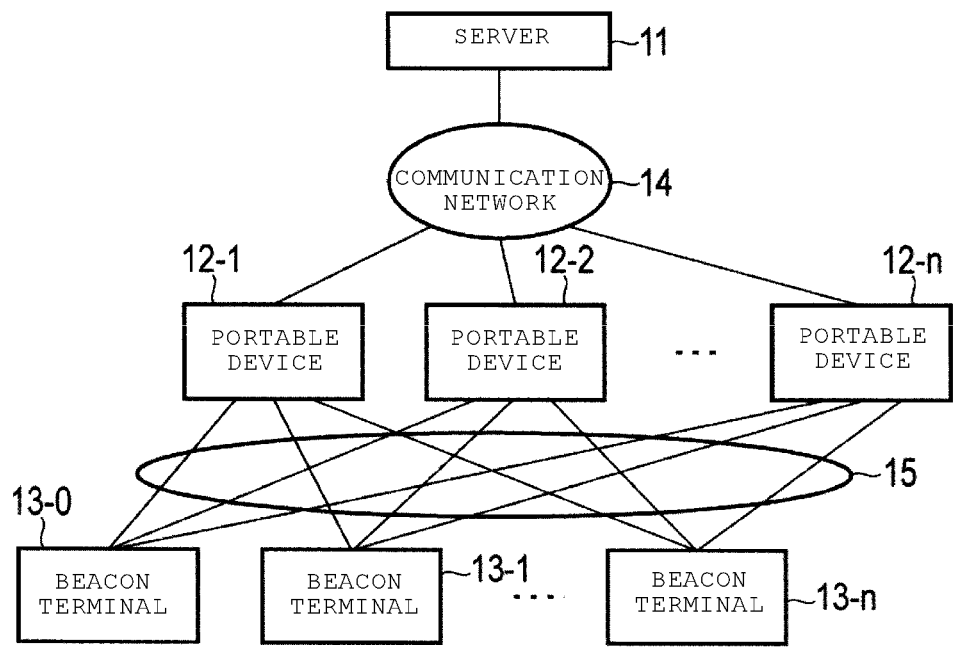
FIG. 1 is a diagram of a position measuring system according to an embodiment.

FIG. 1 is a diagram of a position measuring system according to the present embodiment. The position measuring system includes a server device 11, a plurality of portable devices 12, a plurality of beacon terminals 13, a communication network 14, and a network 15.

The server device 11 operates as a position measuring device that measures the positions of the portable devices 12 by using the beacon terminals 13. The server device 11 receives, from the portable devices 12, data including the radio wave strength (received signal strength indicator (RSSI)) of radio waves received by the portable devices 12 from the beacon terminals 13, for example. The server device 11 measures the positions of the portable devices 12 based on the radio wave strength. Moreover, the server device 11 in the present embodiment also checks the operation states of the beacon terminals 13 based on data received from the portable devices 12.

Each portable device 12 is used as a reception station that receives signals from the beacon terminals 13 in the position measuring system of the present embodiment. A person (such as a worker or customer) in a manufacturing site (a plant), a store, or the like carries the portable device 12, or the portable device 12 is attached to an article, a cart (a small car), or the like. The portable device 12 is a radio communication terminal and, in addition to communicating with the server device 11 via the communication network 14, communicates with the beacon terminals 13 via the network 15 using near-field radio communication. The portable device 12 is, for example, a smartphone or a tablet personal computer (PC).

Each beacon terminal 13 is a radio wave emitting station that emits radio waves in the position measuring system of the present embodiment. The beacon terminal 13 transmits data (a beacon signal) on a regular basis by using near-field radio communication. The beacon terminal 13 communicates by Bluetooth®, for example, and emits a Bluetooth® Low Energy signal (hereinafter abbreviated as a BLE signal). The beacon terminals 13 are disposed in an area in which the positions of the portable devices 12, which are objects whose positions are to be measured, are measured (hereinafter referred to as a position measurement object area). That is, the beacon terminals 13 are distributed over the area with spacing provided between each of the beacon terminals 13. Each beacon terminal 13 operates on electric power which is supplied from a battery, for example.

The communication network 14 is a network that connects the server device 11 and the portable devices 12. The Internet, a wired local area network (LAN), a wireless LAN, Bluetooth®, or Long Term Evolution (LTE®), for example, is used as the communication network 14.

The network 15 is a network that connects the beacon terminals 13 and the portable devices 12. For example, the network 15 uses Bluetooth®.

Figure 2:
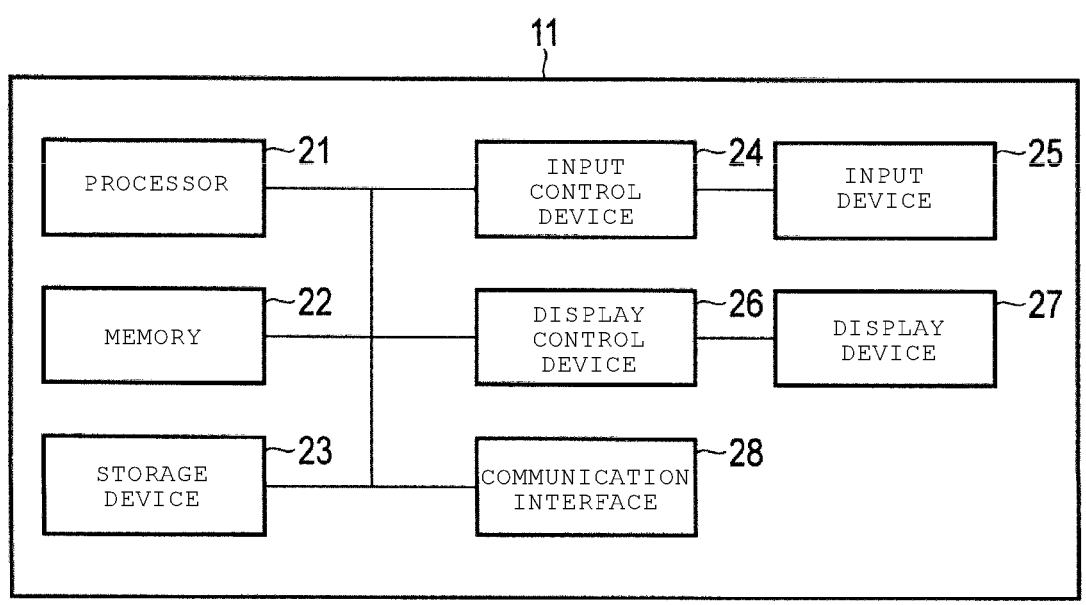
FIG. 2 is a block diagram depicting a configuration of a server device in the position measuring system.

FIG. 2 is a block diagram depicting the configuration of the server device 11 in the present embodiment.

The server device 11 is a computer and includes a processor 21, memory 22, a storage device 23, an input control device 24, an input device 25, a display control device 26, a display device 27, and a communication interface 28.

The processor 21 controls each unit so as to implement various operations as the server device 11 based on an operating system, middleware, and an application program which are stored in the memory 22.

The memory 22 is memory in which the processor 21 temporarily stores data to execute processing. For example, in addition to various programs which are executed by the processor 21, data which is referred to by the processor 21 in executing various types of processing is recorded on the memory 22. For instance, on the memory 22, in addition to various types of information (such as BLE reception information, which will be described later) included in data which is received from the portable devices 12, a data table (which will be described later) for managing the plurality of beacon terminal 13, for example, is recorded. Moreover, the memory 22 stores, for example, image data such as a map image for displaying on the display device 27.

The programs which are executed by the processor 21 include a position measurement program which measures the positions of the portable devices 12 based on the data received from the plurality of portable devices 12 and an operation check program which checks the operation states of the beacon terminals 13 based on the data received from the plurality of portable devices 12.

The storage device 23 stores, for example, in addition to a program which is executed by the processor 21, data which is used by the processor 21 in performing various types of processing or data generated by the processing of the processor 21. The storage device 23 is a nonvolatile recording medium. For example, a solid state drive (SSD) or hard disk drive (HDD) can be used as the storage device 23.

The input control device 24 receives data input from the input device 25 under control of the processor 21. The input device 25 includes, for example, a pointing device such as a mouse or touch panel and a keyboard.

The display control device 26 controls the display device 27 under control of the processor 21. The display device 27 is a display such as a liquid crystal display (LCD) or touch screen. The display device 27 displays a screen such as a map image generated by a program, which is executed by the processor 21, by being controlled by the display control device 26.

The communication interface 28 controls data communication which is performed via the communication network 14 (including the Internet, a LAN, Bluetooth, or the like). The server device 11 communicates with the plurality of portable devices 12 through the communication interface 28.

Figure 3:
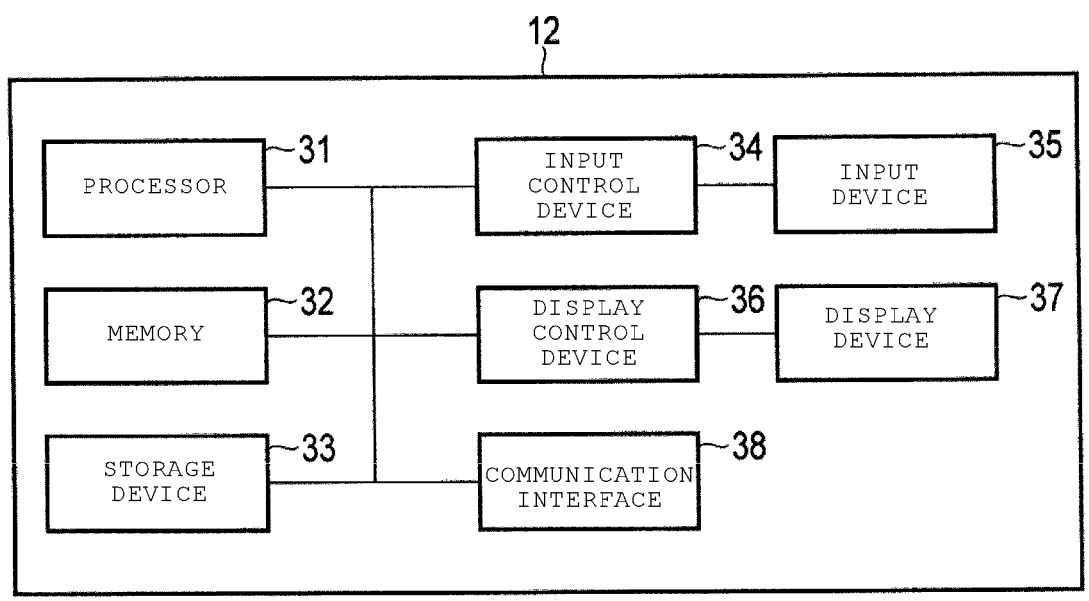
FIG. 3 is a block diagram depicting a configuration of a portable device in the position measuring system.

FIG. 3 is a block diagram depicting the configuration of each portable device 12 in the present embodiment.

The portable device 12 is a computer and includes a processor 31, memory 32, a storage device 33, an input control device 34, an input device 35, a display control device 36, a display device 37, and a communication interface 38.

The processor 31 controls each unit to implement various operations of the portable device 12 based on an operating system and an application program which are stored in the memory 32.

The memory 32 is memory in which the processor 31 temporarily stores data to execute processing. For example, in addition to various programs which are executed by the processor 31, the memory 32 also stores data which is referred to by the processor 31 in performing various types of processing. For instance, the memory 32 stores data which is generated based on the BLE signal received from the beacon terminal 13 and transmitted to the server device 11. The data which is transmitted to the server device 11 includes BLE reception information which is generated based on the BLE signal. The BLE information includes information indicating, for example, the BLE signal reception strength (RSSI), a beacon identifier of the beacon terminal 13, and the reception time of the BLE signal.

The programs which are executed by the processor 31 include a data transmission program which generates data to be transmitted to the server device 11 based on the BLE signal that is received from the beacon terminal 13 and transmits the data to the server device 11 with predetermined timing.

The storage device 33 stores, for example, in addition to a program which is executed by the processor 31, data which is used by the processor 31 in performing various types of processing or data generated by the processing of the processor 31. The storage device 33 is a nonvolatile recording medium such as, for example, a flash memory or a solid state drive (SSD).

The input control device 34 receives data input from the input device 35 under control of the processor 31. The input device 35 includes, for example, a pointing device such as a touch panel.

The display control device 36 controls display in the display device 37 under control of the processor 31. The display device 37 is a display such as a liquid crystal display (LCD) or a touch screen. The display device 37 displays a screen such as a map image generated by a program, which is executed by the processor 31, by being controlled by the display control device 36.

The communication interface 38 includes a first communication circuit which communicates with each beacon terminal 13 and a second communication circuit which communicates with the server device 11 via the communication network 14. The first communication circuit controls data communication which is performed via the network 15 in accordance with the standards of a near-field radio communication protocol (in this embodiment, BLE). The first communication circuit receives a beacon signal (a Bluetooth beacon signal) transmitted from a beacon terminal 13. Based on the beacon signal, the first communication circuit detects a beacon identifier, which is an identification code of the beacon terminal 13 that is a source of the beacon signal. Moreover, the first receiving circuit measures the reception strength (received signal strength indicator (RSSI)) of radio waves of the beacon signal. Information indicating the beacon identifier detected by the first communication circuit and an RSSI value indicating the reception strength (RSSI) of radio waves of the beacon signal is transmitted to the server device 11 as BLE reception information.

Though not depicted in the drawings, the beacon terminal 13 is a computer. That is, the beacon terminal 13 executes programs stored in memory by a processor and thereby executes various types of processing in accordance with the programs. The processor provided in the beacon terminal 13 may be a microprocessor tailored to control as the radio wave emitting station, and not necessarily a general-purpose CPU which is used in a personal computer or the like. The processor controls each unit to implement various functions as the radio wave emitting station in the position measuring system in accordance with an embedded communication protocol (for example, various profiles of Bluetooth®) program or application program.

In the beacon terminal 13, a communication interface (a transmitting circuit or a transmitting and receiving circuit) controls communication with the portable device 12 (the first communication circuit of the communication interface 38). The communication interface (the transmitting circuit or the transmitting and receiving circuit) transmits a beacon signal (a Bluetooth® beacon signal) in accordance with the standards of the near-field radio communication protocol (in this embodiment, BLE).

Figure 4:
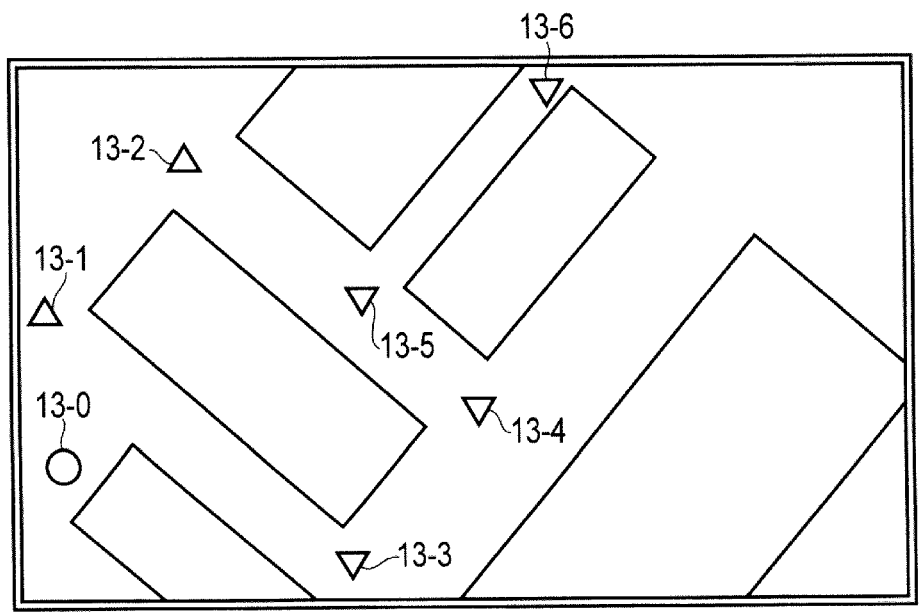
FIG. 4 is a diagram depicting an example of beacon terminals disposed in a position measurement object area in the position measuring system.

FIG. 4 depicts an example of the beacon terminals 13 disposed in the position measurement object area in the present embodiment.

FIG. 4 illustrates part of the layout of a store which is set as the position measurement object area, for example. The plurality of beacon terminals 13 (13-0, 13-1, . . . , 13-6) are disposed with spacing provided therebetween along routes, for example, through which the portable devices 12, whose positions are to be measured, move.

FIG. 5 is a diagram depicting an example of a data table for managing the plurality of beacon terminals 13 disposed in the position measurement object area. In the data table, one row of data is set for one beacon terminal 13. Each row includes a beacon identifier, a map image, installation coordinates, a time threshold value, a positioning system, a beacon set as a neighboring beacon, and a malfunction determination.

The beacon identifier is a unique identification code individually associated with the beacon terminal 13. The map image indicates an image which is used when the placement of the beacon terminal 13 is displayed. The installation coordinates indicate the absolute installation position of the beacon terminal 13 in the position measurement object area. The time threshold value (a first threshold value) is threshold value data for determining the operation state of the beacon terminal 13. The time threshold value is data for determining whether or not the operation state of the beacon terminal 13 is normal based on the elapsed time from the last time at which the portable device 12 received the last beacon signal from the beacon terminal 13. The same time threshold value may be set for all the beacon terminals 13 or, as illustrated in FIG. 5, different values can be set for the beacon terminals 13. The positioning system is data indicating a positioning system which measures the position of the portable device 12 by using the beacon terminal 13. Any one of a one-point positioning system, a two-point positioning system, and a three-point positioning system, for example, is set as the positioning system. The beacon set as a neighboring beacon is data indicating another neighboring beacon terminal 13 that is used for position measurement using the two-point positioning system when the two-point positioning system is set as the positioning system. The malfunction determination is data indicating the result of a malfunction determination which is made on the beacon terminal 13.

Next, an operation of the position measuring system in the present embodiment will be described.

First Embodiment

In a first embodiment, an operation check method is described in which a determination is made that the beacon terminal 13 is malfunctioning if the elapsed time from the last reception time at which the portable device 12 received the BLE signal from the beacon terminal 13 exceeds a previously set time threshold value.

Figure 6:
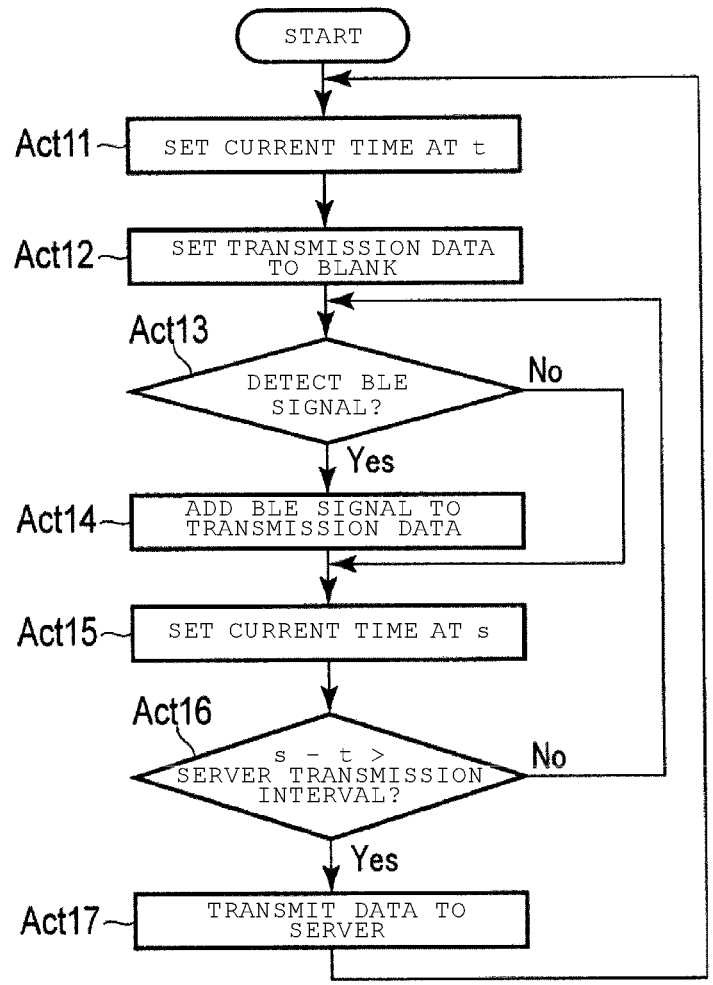
FIG. 6 is a flowchart of processing of the portable device according to a first embodiment.

FIG. 6 is a flowchart of processing of the portable device 12 according to the first embodiment.

The portable device 12 is carried by a person (for example, a worker) who moves in the position measurement object area such as a manufacturing site (plant premises) and, as a result of the worker (hereinafter referred to as a movable body) moving in the position measurement object area, the portable device 12 can receive various BLE signals which the beacon terminals 13 disposed in different spots are emitting.

The processor 31 of the portable device 12 sets the current time at t, which indicates an initial time, in order to determine timing with which the processor 31 transmits data to the server device 11 (Act 11). Moreover, the processor 31 sets transmission data which the processor 31 transmits to the server device 11 to blank (Act 12). If the portable device 12 detects a BLE signal transmitted from any beacon terminal 13 (Act 13, Yes), the portable device 12 generates BLE reception information in accordance with the BLE signal and adds the BLE reception information to the transmission data to be transmitted to the server device 11 (Act 14). The BLE reception information includes the received radio wave strength (RSSI) of the BLE signal detected by the portable device 12, the beacon identifier indicating the source of the BLE signal, the reception time, and so forth. It is to be noted that the beacon identifier is included in the BLE signal that is received from the beacon terminal 13.

The processor 31 updates the time elapsed from the initial time by setting the current time at s irrespective of the presence or absence of detection of the BLE signal (Act 15).

Here, the processor 31 checks whether or not the value of (s−t) exceeds a server transmission interval which is set in the portable device 12 in advance. If the value of (s−t) does not exceed the server transmission interval (Act 16, No), the processor 31 goes back to the BLE signal detection processing. If the BLE signal from the beacon terminal 13 is detected, the processor 31 adds the BLE reception information to the transmission data in a similar manner.

On the other hand, if the value of (s−t) exceeds the server transmission interval (Act 16, Yes), the processor 31 transmits the transmission data to the server device 11 through the communication network 14 (Act 17). Then, the processor 31 goes back to the processing in Act 11 and executes the same processing as the processing described above.

In the position measurement object area, a plurality of movable bodies move on the manufacturing site (in the position measurement object area), carrying different portable devices 12. As a result of the movable bodies passing through the routes on which the plurality of beacon terminals 13 are disposed while carrying the portable devices 12, the portable devices 12 each receive the transmission data transmitted from the plurality of beacon terminals 13. Each movable body does not necessarily pass through the routes on which all the beacon terminals 13 are disposed. However, by receiving the transmission data from each of the portable devices 12 carried by the plurality of movable bodies, the server device 11 can collect the BLE reception information generated based on the BLE signals received from all (or most of) the beacon terminals 13 disposed in the position measurement object area.

Next, an operation of the server device 11 in the present embodiment will be described.

Figure 7:
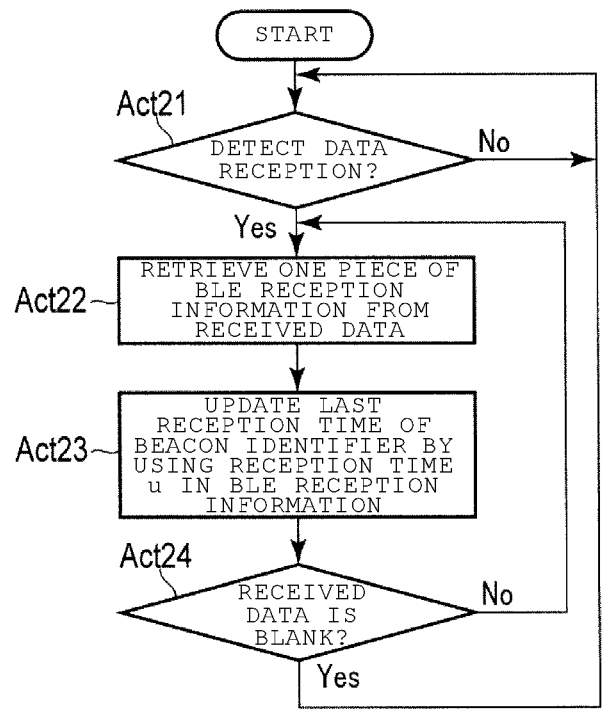
FIG. 7 is a flowchart of data reception processing of the server device in the first embodiment.

FIG. 7 is a flowchart of data reception processing of the server device 11 in the first embodiment.

The server device 11 checks whether or not the server device 11 detects data reception from the portable device 12 through the communication network 14. If the processor 21 of the server device 11 detects data reception from the portable device 12 (Act 21, Yes), the processor 21 retrieves, from the received data, one piece of BLE reception information on which a determination is to be made (Act 22).

By using a beacon identifier i and a reception time u which are included in the BLE reception information, the processor 21 updates the value of the last reception time (which is referred to as a last reception time u) of the beacon identifier i (Act 23).

After performing update of the value of the last reception time of the beacon on one piece of BLE reception information, if processing of all the BLE reception information included in the received data is not completed (Act 24, No), the processor 21 retrieves next BLE reception information (Act 22) and executes the same processing as the processing described above (Acts 22 to 24).

Figure 8:
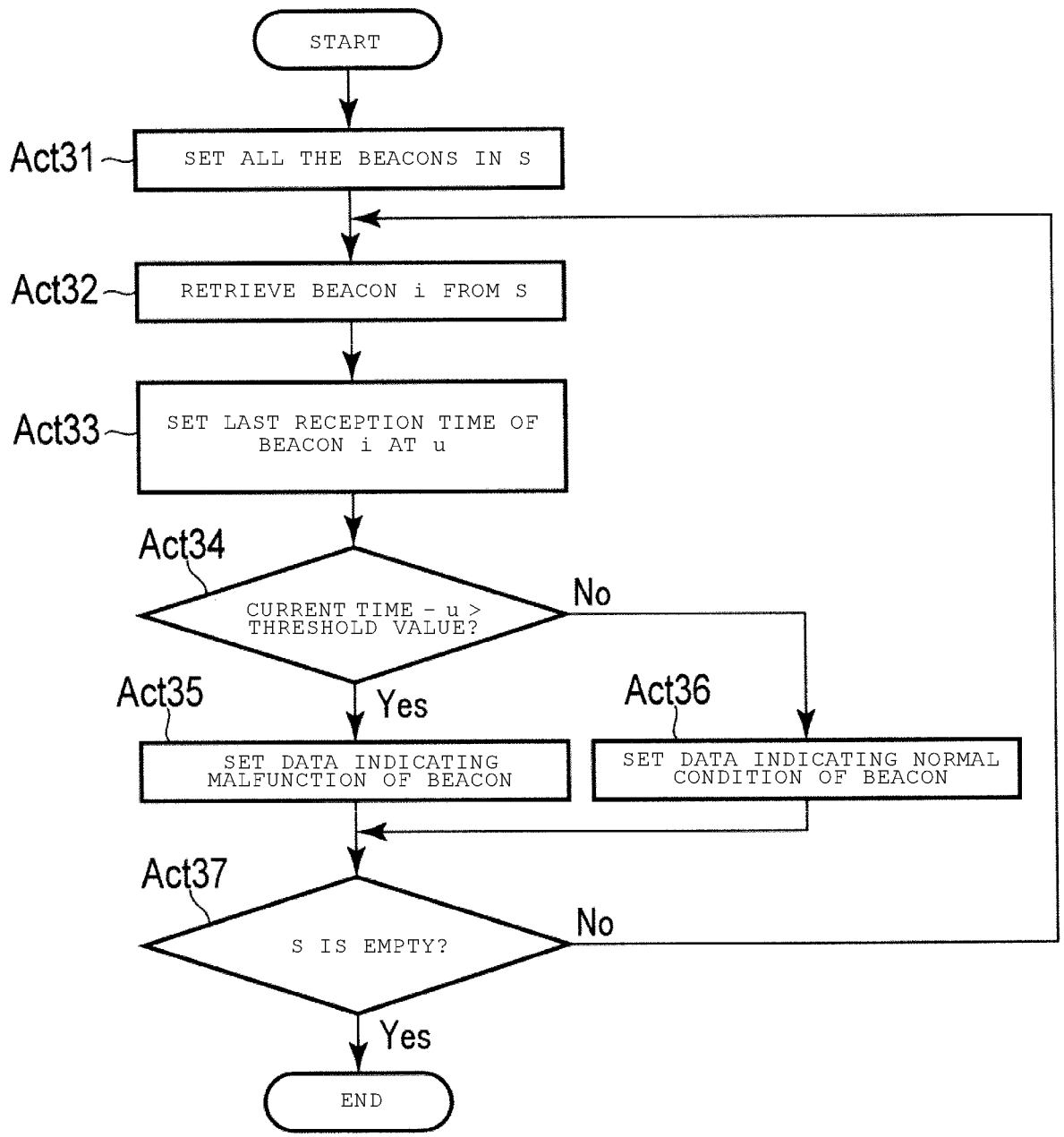
FIG. 8 is a flowchart of failure determination processing which is performed by the server device in the first embodiment.

FIG. 8 is a flowchart of failure determination processing which is performed by the server device 11 in the first embodiment.

In the failure determination processing, the processor 21 sets all the beacons in S (storage area) indicating each beacon terminal 13 on which processing is to be performed (Act 31). Moreover, the processor 21 retrieves one beacon from S and sets the beacon identifier thereof to a beacon identifier i (Act 32), and sets the last reception time of the beacon identifier i at u (Act 33). The processor 21 determines whether the elapsed time from the last reception time u exceeds a time threshold value (a first threshold value) which is previously set in the data table in correlation with the beacon identifier i. For example, the processor 21 calculates a difference between the current time and the last reception time u and checks whether or not the time difference (the time from the last reception time u to the current time) exceeds the time threshold value.

Here, if a determination is made that the difference between the current time and the last reception time u exceeds the time threshold value corresponding to the beacon identifier i (Act 34, Yes), the processor 21 determines that the beacon terminal 13 corresponding to the beacon identifier i is malfunctioning. In accordance with the determination result, the processor 21 sets data indicating a malfunction (an abnormal condition) as the result of the malfunction determination in correlation with the beacon identifier i in the data table (Act 35).

On the other hand, if a determination is made that the difference between the current time and the last reception time u does not exceed the time threshold value corresponding to the beacon identifier i (Act 34, No), the processor 21 determines that the beacon terminal 13 corresponding to the beacon identifier i is not malfunctioning. In accordance with the determination result, the processor 21 sets data indicating a normal condition as the result of the malfunction determination in correlation with the beacon identifier i in the data table. (Act 36). If data indicating a normal condition is set as an initial setting, the processor 21 need not update the data table in Act 36.

The processor 21 checks whether or not S is empty, i.e., whether or not all beacons in S have been subject to the failure determination processing. If a determination is made that S is not empty (Act 37, No), the processing is returned to Act 32 in which a beacon is retrieved from S. On the other hand, if a determination is made that S is empty (Act 37, Yes), the processor 21 ends the beacon failure determination processing.

As described above, if a determination is made that the elapsed time from the last reception time u at which the BLE signal was received from the beacon terminal 13 exceeds the previously set time threshold value based on the BLE reception information included in the received data received from the portable device 12, the server device 11 of the first embodiment can determine that the beacon terminal 13 is malfunctioning. The server device 11 receives, from each of the plurality of portable devices 12 that move with the movable bodies moving in the position measurement object area, the BLE signal which each portable device 12 received from the beacon terminal 13 and determines whether or not each beacon terminal 13 is malfunctioning. That is, the portable device 12 which is routinely used for position measurement in the position measuring system, not a signal reception terminal which is used for checking the operation of the beacon terminal 13, is used. This eliminates the need for maintenance work in which the operation states of all the beacon terminals 13 are individually determined by going to each place where each of the beacon terminals 13 are disposed to check the operation states of all of the beacon terminals 13 in the position measurement object area.

Next, threshold value change processing by which the time threshold value set in the data table is changed will be described.

Figure 9:
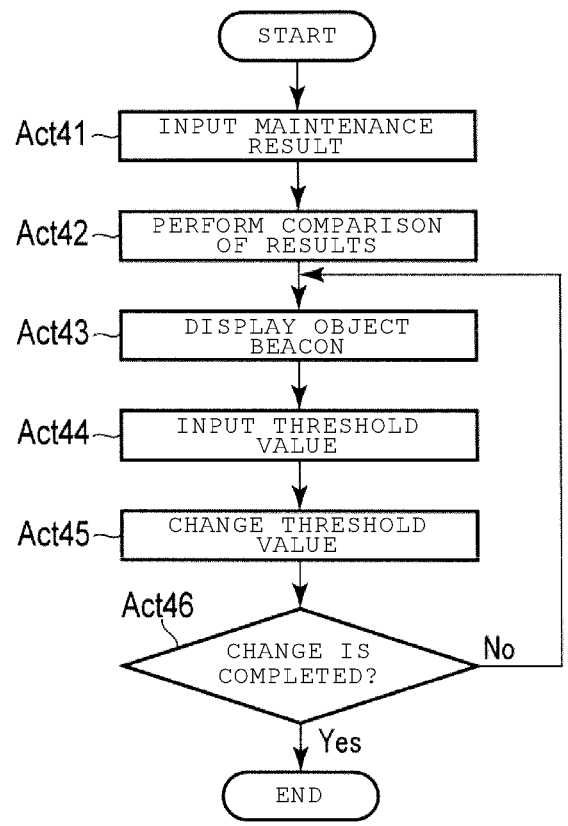
FIG. 9 is a flowchart of time threshold value update processing of the server device in the first embodiment.

FIG. 9 is a flowchart of time threshold value update processing of the server device 11 in the first embodiment.

As described above, the server device 11 can determine whether the beacon terminal 13 is malfunctioning based on the BLE reception information included in the received data from the portable device 12. With respect to the beacon terminal 13 on which a determination was made that the beacon terminal 13 was malfunctioning, maintenance work is usually conducted. That is, the maintenance work includes a check as to whether or not the beacon terminal 13, on which a determination was made that the beacon terminal 13 was malfunctioning, emits the BLE signal is performed near the beacon terminal 13.

Here, if the beacon terminal 13 emits the BLE signal, that is, if the beacon terminal 13 is not malfunctioning, there is a possibility that the value of the time threshold value used in the beacon failure determination is not appropriate. For instance, in the case of the beacon terminal 13 disposed on a route through which the movable bodies do not frequently pass, even when the beacon terminal 13 operates normally, the frequency of reception of the BLE signal by the portable devices 12 is low. Thus, by changing the time threshold value set for the beacon terminal 13 to a new threshold value, the accuracy of a malfunction determination is improved.

First, the server device 11 detects an input of the result of the maintenance work conducted on the beacon terminal 13 on which a determination was made that the beacon terminal 13 was malfunctioning (Act 41). The processor 21 compares the result of the malfunction determination made on each individual beacon terminal 13 disposed in the position measurement object area and the result of the maintenance work (Act 42). That is, the processor 21 extracts, from the beacon terminals 13 on which a determination was made that the beacon terminals 13 were malfunctioning, a beacon terminal 13 confirmed to operate normally by the maintenance work and controls the display device 27 display the information on this beacon terminal 13 as an object whose time threshold value is to be changed (Act 43).

When the value of a changed time threshold value is input by an operation performed on the input device 25 (Act 44), the processor 21 changes the time threshold value corresponding to the beacon terminal 13 whose time threshold value in the data table is to be changed (Act 45).

If there is more than one beacon terminal 13 whose time threshold value in the data table is to be changed (Act 46, No), the processor 21 controls the display device 27 to display the information on another beacon terminal 13 whose time threshold value in the data table is to be changed, inputs the value of a changed time threshold value, and changes the data table in a manner similar to those described above (Acts 43 to 46).

If change of the time threshold values of all the beacon terminals 13 whose time threshold values in the data table are to be changed is completed (Act 46, Yes), the processor 21 ends the threshold value change processing.

In the threshold value change processing, the value is changed so that the time threshold value, which is used in making the determination that the beacon terminal 13 is malfunctioning, becomes larger than the current time threshold value. If the time threshold value is set for each beacon terminal 13 (beacon identifier) as illustrated in FIG. 5, only the time threshold value corresponding to the beacon terminal 13 whose time threshold value in the data table is to be changed is changed. If the time threshold value is set for a plurality of beacon terminals 13, the time threshold value set for the plurality of beacon terminals 13 can be changed. For example, when a plurality of beacon terminals 13 are managed on a specific area-by-specific area basis, if the time threshold value of one beacon terminal 13 included in a specific area is changed, change of the time threshold value is collectively performed on the other beacon terminals 13 included in the specific area.

Moreover, the above description deals with a case where the value of a changed time threshold value is input by an input operation which is performed with respect the display device 27; however, the value of a changed time threshold value may be dynamically set based on the received data (the BLE reception information) from the portable devices 12. For example, the processor 21 calculates an optimum time threshold value in accordance with the frequency of reception of the BLE reception information of each beacon terminal 13. For instance, the processor 21 calculates the time threshold value in such away as to make small (shorten the time) the time threshold value of the beacon terminal 13 disposed in an area through which the movable bodies carrying the portable devices 12 pass frequently. Likewise, the processor 21 calculates the time threshold value in such a way as to make large (lengthen the time) the time threshold value of the beacon terminal 13 disposed in an area through which the movable bodies do not pass frequently. By so doing, the accuracy of a malfunction determination which is made with respect to each beacon terminal 13 can be improved by setting an optimum time threshold value in accordance with the actual operation of the portable devices 12 in the position measuring system.

Second Embodiment

Next, a second embodiment will be described.

In the second embodiment, in addition to the malfunction determination in the first embodiment described above, a failure determination is made on another beacon (referred to as a nearby beacon) disposed physically close to a beacon terminal 13 (a beacon i corresponding to a beacon identifier i) on which a beacon failure determination is made. By doing so, the accuracy of a failure determination which is made on the beacon terminal 13 is improved.

Figure 10:
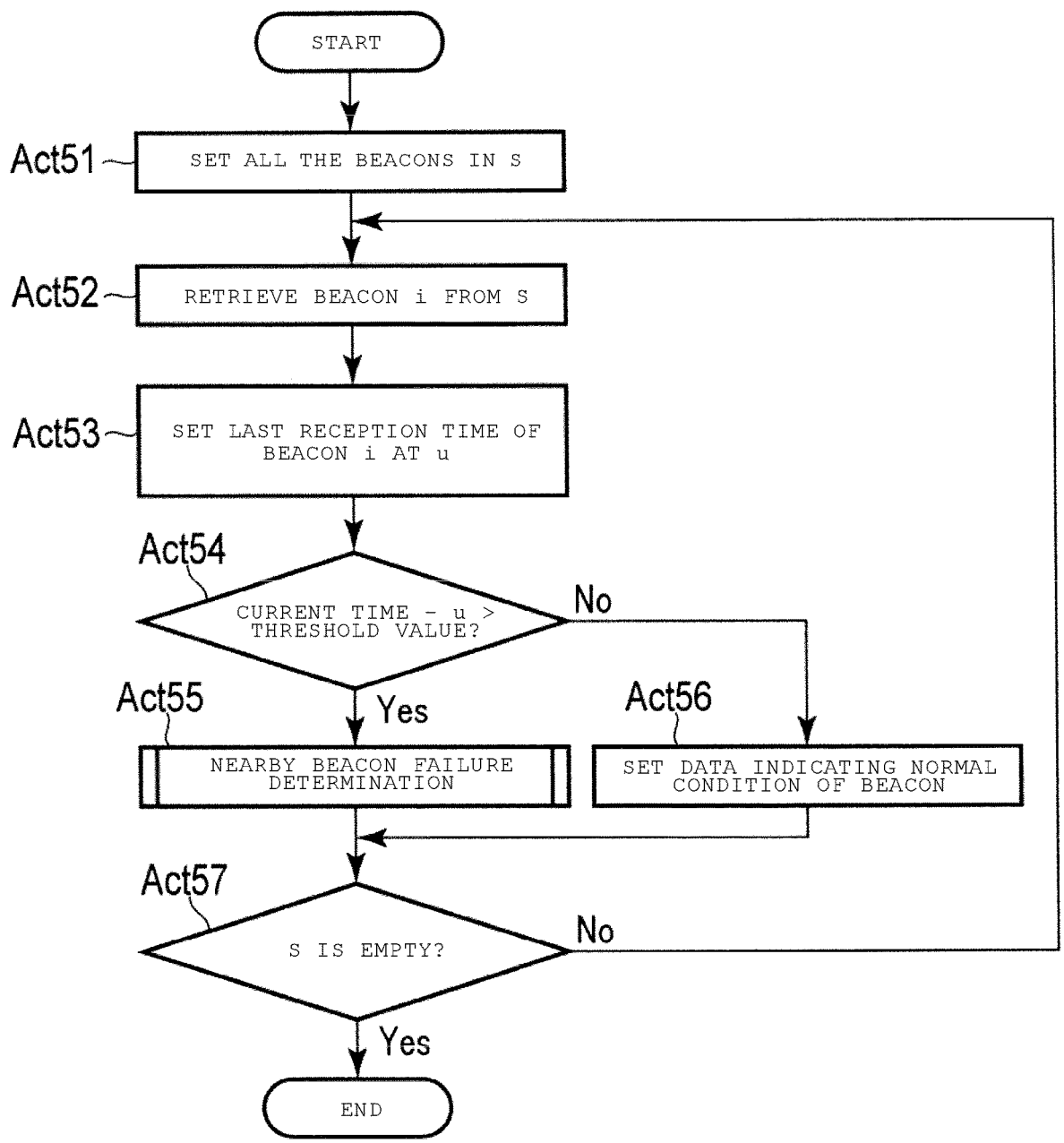
FIG. 10 is a flowchart of beacon failure determination processing which is performed by the server device according to a second embodiment.

FIG. 10 is a flowchart of beacon failure determination processing which is performed by the server device 11 of the second embodiment. Also in the second embodiment, processing similar to the processing of the flowchart in FIG. 7 is assumed to be executed.

In the beacon failure determination processing of the second embodiment, processing similar to the processing in Acts 31, 32, 33, 34, 36, and 37 in FIG. 8 is executed in Acts 51, 52, 53, 54, 56, and 57 in FIG. 10. Accordingly, the description of Acts 51, 52, 53, 54, 56, and 57 is omitted.

If a determination is made that the difference between the current time and the last reception time u exceeds the time threshold value corresponding to the beacon identifier i (Act 54, Yes), the processor 21 executes failure determination processing (nearby beacon failure determination processing) on a nearby beacon (Act 55).

Figure 11:
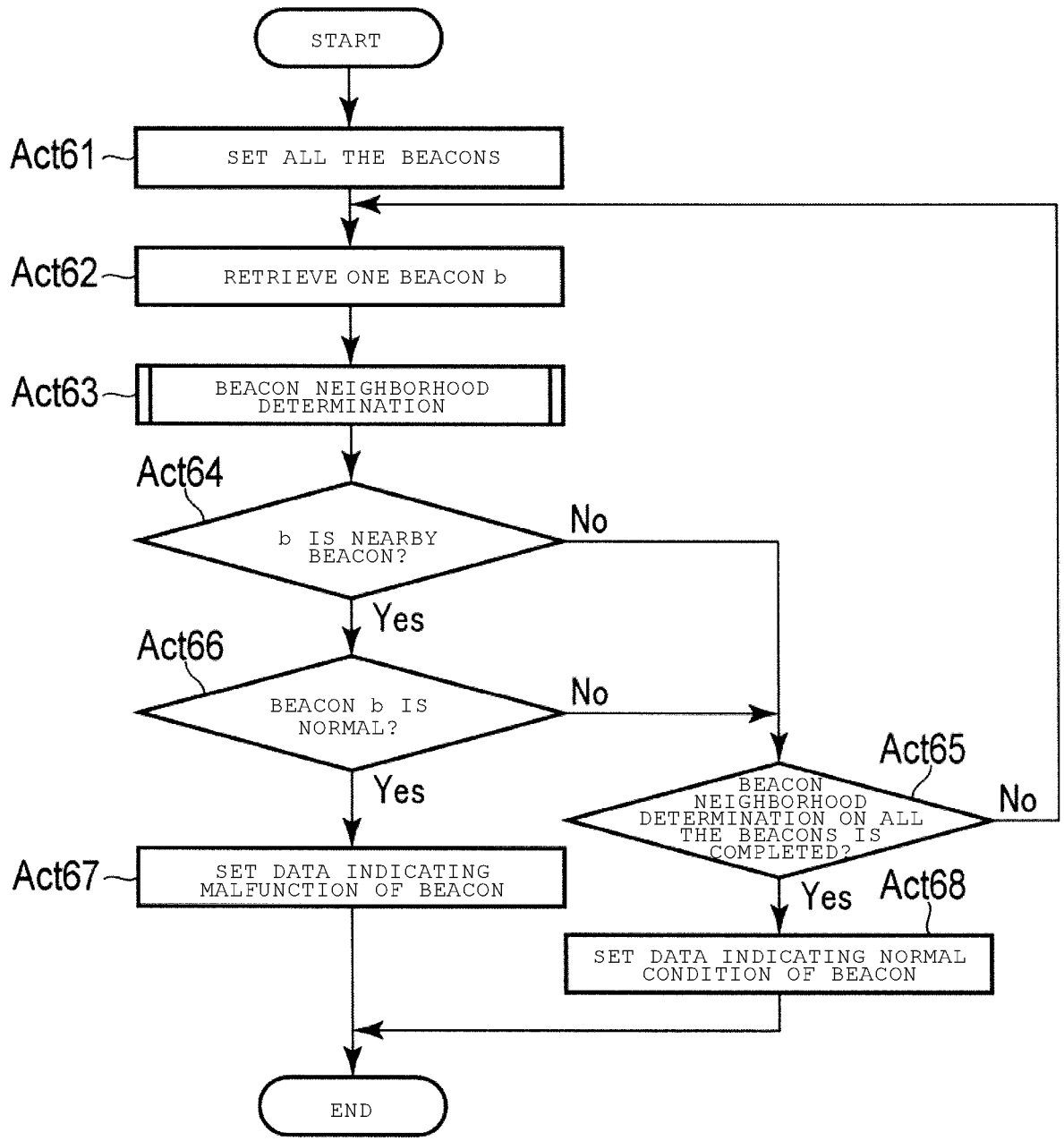
FIG. 11 is a flowchart of nearby beacon failure determination processing in the server device in the second embodiment.

FIG. 11 is a flowchart of the nearby beacon failure determination processing in the server device 11 in the second embodiment.

First, the processor 21 sets, in S, all the beacon terminals 13 disposed in the position measurement object area as objects on which the nearby beacon failure determination processing is to be performed (Act 61). The processor 21 retrieves, from S indicating all the beacon terminals 13 set as the objects on which the processing is to be performed, one beacon terminal 13 (a beacon b) on which a beacon neighborhood determination is to be made (Act 62) and performs beacon neighborhood determination processing (Act 63).

Figure 12:
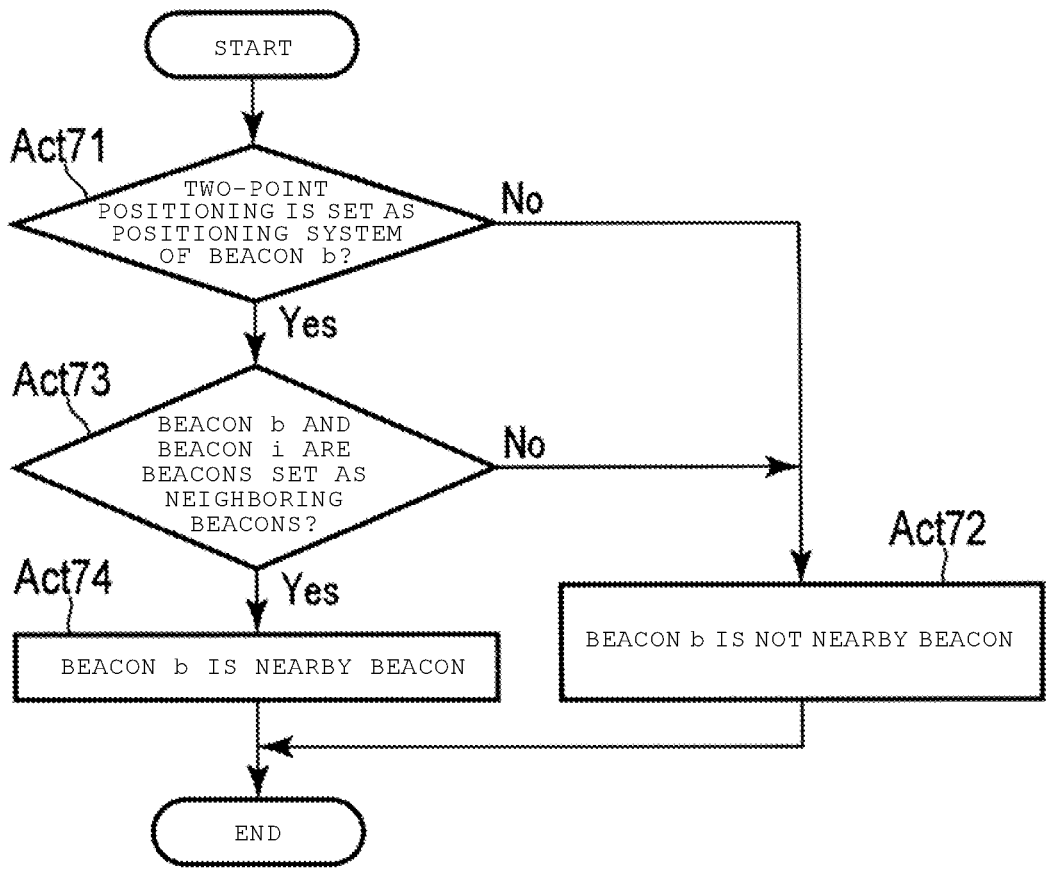
FIG. 12 is a flowchart of beacon neighborhood determination processing in the second embodiment.

FIG. 12 is a flowchart of the beacon neighborhood determination processing in the second embodiment.

As the beacon neighborhood determination processing, the processor 21 first determines whether or not two-point positioning is set as the positioning system of the beacon b by referring to the data table. Here, if two-point positioning is not set as the positioning system of the beacon b (Act 71, No), the processor 21 determines that the beacon b is not a nearby beacon (Act 72) and ends the beacon neighborhood determination processing.

On the other hand, if two-point positioning is set as the positioning system of the beacon b (Act 71, Yes), the processor 21 determines whether or not the beacon b and the beacon i are beacons set as neighboring beacons by referring to the data table. Here, if the beacon b and the beacon i are beacons set as neighboring beacons (Act 73, Yes), the processor 21 determines that the beacon b is a nearby beacon (Act 74); if the beacon b and the beacon i are not set as neighboring beacons (Act 73, No), the processor 21 determines that the beacon b is not a nearby beacon (Act 72).

In the beacon neighborhood determination processing, if a determination is made that the beacon b is a nearby beacon (Act 64, Yes), the processor 21 determines whether a determination was made that the beacon b was normal or malfunctioning (was not normal) by referring to the malfunction determination in the data table. If the beacon b is normal (Act 66, Yes), the processor 21 determines that the beacon terminal 13 corresponding to the beacon identifier i is malfunctioning. In accordance with the determination result, the processor 21 sets data indicating a malfunction (an abnormal condition) as the result of the malfunction determination in correlation with the beacon identifier i in the data table (Act 67). That is, if the beacon b is normal, the portable device 12 that received the BLE signal from the beacon b is present near the beacon b. Since the beacon b and the beacon i are installed in physically close positions, if the beacon i is normal, the BLE signal of the beacon i is received by the same portable device 12. However, the fact that the BLE signal from the beacon i is not received by the portable device 12 indicates a high probability that the beacon i is malfunctioning, and a determination is made that the beacon i is malfunctioning.

On the other hand, if a determination is made that the beacon b is malfunctioning (is not normal) (Act 66, No), the processor 21 does not make a beacon failure determination and determines whether the beacon neighborhood determination on all the beacon terminals 13 is completed. That is, if a determination is made that not only the beacon i, but also the beacon b disposed near the beacon i is malfunctioning, there is a high probability that a determination was made that the beacon i and the beacon b were malfunctioning because the movable bodies with the portable devices 12 did not move near the beacon i and the beacon b within a time indicated by the time threshold value. Thus, the determination result of the beacon failure determination based on the beacon b is not set. If the beacon neighborhood determination on all the beacon terminals 13 is not completed (Act 65, No), the processor 21 retrieves one beacon terminal 13 (a beacon b) on which a next beacon neighborhood determination is to be made (Act 62) and performs beacon neighborhood determination processing (Act 63).

If a determination is made that the beacon b is not a nearby beacon (Act 64, No), the processor 21 determines that the beacon b and the beacon i are physically separated from each other and, as in the above-described case where the beacon b is not normal, the processor 21 does not make a beacon failure determination and determines whether the beacon neighborhood determination on all the beacon terminals 13 is completed. If the beacon neighborhood determination on all the beacon terminals 13 is not completed (Act 65, No), the processor 21 retrieves one beacon terminal 13 (beacon b) on which the next beacon neighborhood determination is to be made (Act 62) and performs beacon neighborhood determination processing (Act 63).

If the beacon neighborhood determination on all the beacon terminals 13 is completed (Act 65, Yes), the processor 21 determines that the beacon terminal 13 corresponding to the beacon identifier i is not malfunctioning. In accordance with the determination result, the processor 21 sets data indicating a normal condition as the result of the malfunction determination in correlation with the beacon identifier i in the data table (Act 68).

In the above description, data of the positioning system and the beacon set as a neighboring beacon in the data table is used in the beacon neighborhood determination processing, but a determination method using the installation coordinates of the beacon terminals 13 can also be used as a beacon neighborhood determination.

Figure 13:
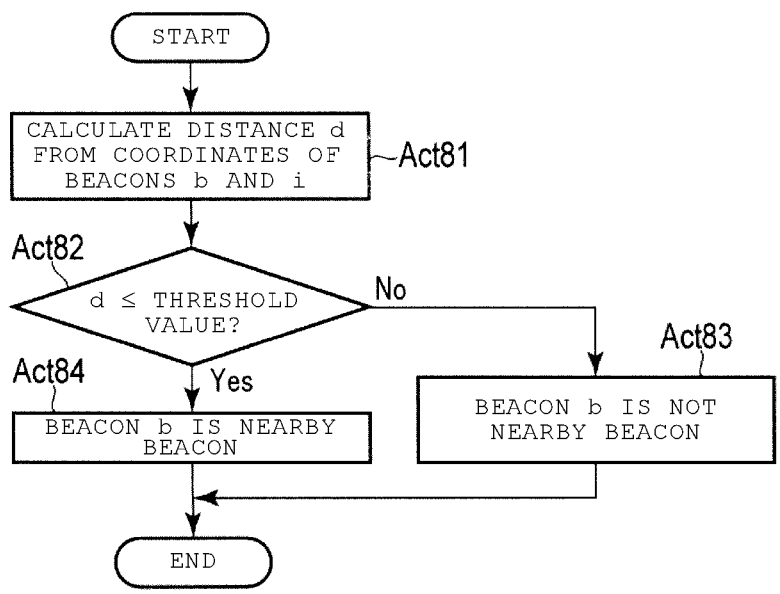
FIG. 13 is a flowchart of a determination method using the installation coordinates of beacon terminals in the second embodiment.

FIG. 13 is a flowchart of a determination method using the installation coordinates of the beacon terminals 13 in the second embodiment.

The processor 21 calculates a distance d between the beacon b and the beacon i from the coordinates (xb, yb) of the beacon b and the coordinates (xi, yi) of the beacon i based on an equation for calculating the distance between the existing two points (Act 81).

If the distance d does not exceed a previously set threshold value for a distance (Act 82, Yes), the processor 21 determines that the beacon b is a nearby beacon (Act 84). On the other hand, if the distance d exceeds the threshold value (Act 82, No), the processor 21 determines that the beacon b is not a nearby beacon (Act 83). As a result, the processor 21 can execute beacon neighborhood determination processing by using the beacon b whose positioning system is not two-point positioning or the beacon b whose positioning system is two-point positioning but is not set as a neighboring beacon in the data table.

As described above, in the second embodiment, by making a determination by using not only the determination result on the beacon i on which a beacon failure determination is to be made, but also the determination result of a beacon failure determination made on another beacon b disposed near the beacon i, the accuracy of a malfunction determination can be further improved.

Third Embodiment

Next, a third embodiment will be described.

In the third embodiment, in addition to the malfunction determination in the first embodiment described above, information on a remaining battery level of the beacon terminal 13 on which a beacon failure determination is made is used. By so doing, the accuracy of a failure determination which is made on the beacon terminal 13 is improved.

Figure 14:
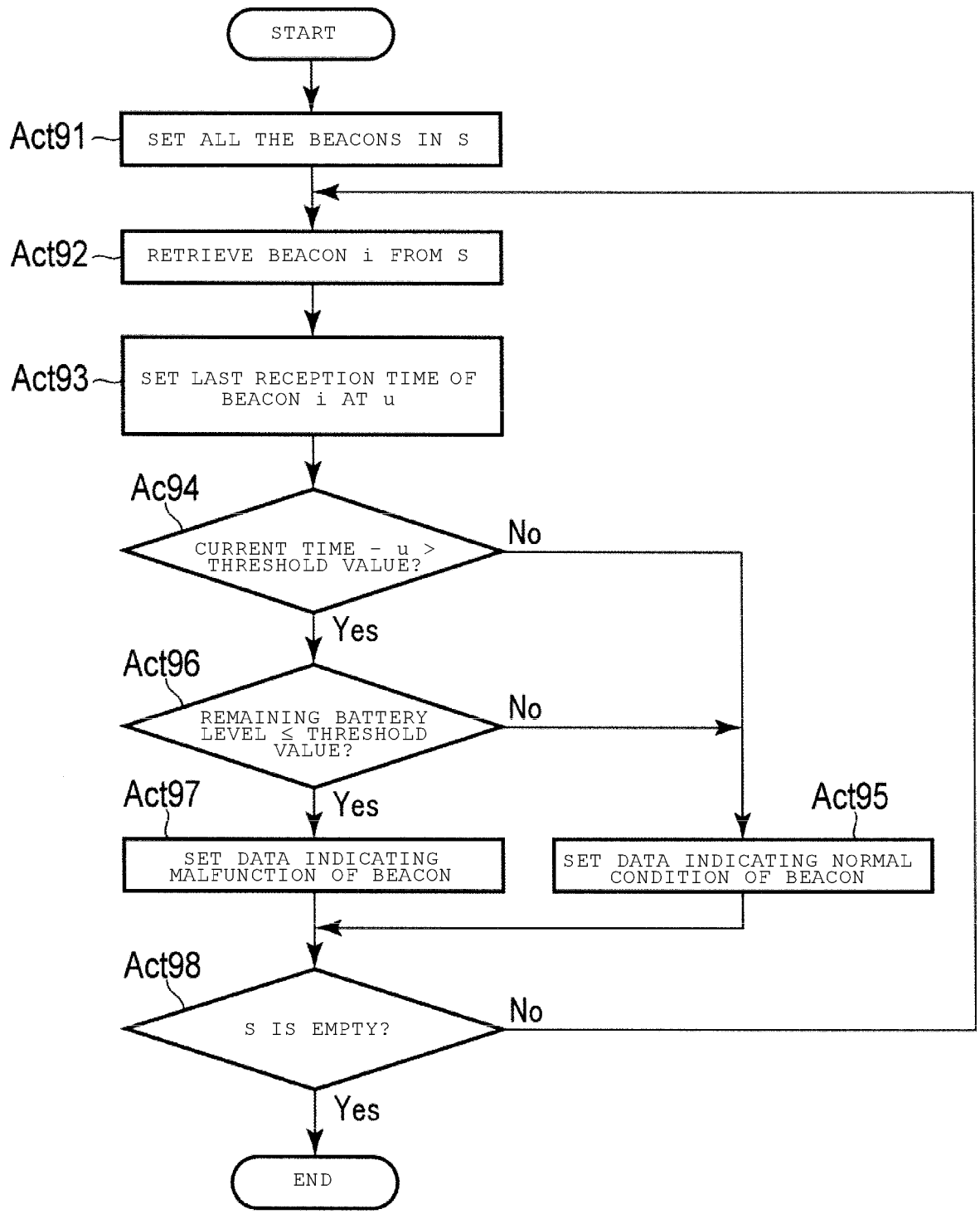
FIG. 14 is a flowchart of beacon failure determination processing which is performed by the server device according to a third embodiment.

FIG. 14 is a flowchart of beacon failure determination processing which is performed by the server device 11 in the third embodiment. In the third embodiment, processing similar to the processing of the flowchart in FIG. 7 is assumed to be executed.

In the beacon failure determination processing of the third embodiment, processing similar to the processing in Acts 31, 32, 33, 34, and 37 in FIG. 8 is executed in Acts 91, 92, 93, 94, and 98 in FIG. 14. Accordingly, the description of Acts 91, 92, 93, 94, and 98 is omitted.

If a determination is made that the difference between the current time and the last reception time u exceeds the time threshold value corresponding to the beacon identifier i (Act 94, Yes), the processor 21 executes remaining battery level determination processing on the beacon i. In the third embodiment, the portable device 12 is assumed to receive remaining battery level data indicating the remaining level of the battery placed in the beacon terminal 13 as part of the BLE signal which the portable device 12 receives from the beacon terminal 13. The portable device 12 is assumed to include the remaining battery level data of the beacon terminal 13 in the BLE reception information which is generated based on the BLE signal.

The processor 21 compares a value indicated by the remaining battery level data and a previously set threshold value (a second threshold value) for a remaining battery level. If the remaining battery level is within the threshold value (Act 96, Yes), the processor 21 determines that the beacon i is malfunctioning. In accordance with the determination result, the processor 21 sets data indicating a malfunction (an abnormal condition) as the result of the malfunction determination in correlation with the beacon identifier i in the data table (Act 97). That is, the processor 21 determines that, when the BLE signal is not received after the last reception time after a lapse of the time threshold value, there is a high possibility that the beacon terminal 13 is not operating normally due to a low remaining battery level.

On the other hand, if the remaining battery level exceeds the threshold value (Act 96, No), the processor 21 determines that the beacon i is normal because there is a high possibility that the beacon i is not malfunctioning. In accordance with the determination result, the processor 21 sets data indicating a normal condition as the result of the malfunction determination correlation with the beacon identifier i in the data table (Act 95).

Moreover, in place of making a malfunction determination by using the remaining battery level of the beacon i, a determination may be made that, if a difference between the time at which the battery was placed in the beacon i and the current time exceeds a threshold value, the beacon i is determined to be malfunctioning; otherwise, the beacon i is determined to be normal. In this case, when the battery in the beacon terminal 13 is changed, the processor 21 of the server device 11 automatically updates data indicating the time at which the battery was changed. For instance, the processor 21 updates data indicating the time at which the battery was changed by determining that the battery was changed if the remaining battery level is raised irrespective of a lapse of time based on the history of the remaining battery level data included in the BLE reception information. Update can be performed based on the reception time included in the BLE reception information as the time at which the battery was changed.

Furthermore, in place of using the remaining battery level of the beacon i, a predicted time which elapses before the remaining battery level becomes zero can be calculated based on a battery placement time, the strength of emitted radio waves of the beacon i, and an emitted radio wave interval. If the battery placement time plus the predicted time exceeds the current time, a determination can be made that the beacon i is malfunctioning. If the battery placement time plus the predicted time does not exceed the current time, since there is a high probability that the beacon i is not malfunctioning, a determination is made that the beacon i is normal. Since the amount of consumed power can be calculated from the strength of emitted radio waves and the emitted radio wave interval, a time which elapses before the remaining battery level becomes zero can be calculated from the battery capacity and the amount of consumed power of the beacon i.

As described above, by using the information on the remaining battery level of the battery placed in the beacon terminal 13, the accuracy of a malfunction determination which is made on the beacon terminal 13 can be improved.

Maintenance work is conducted by maintenance staff on the beacon terminal 13 on which a determination was made by the server device 11 of the above-described first to third embodiments that the beacon terminal 13 was malfunctioning. The display device 37 of the portable device 12, for example, is made to display the result of the malfunction determination made on the beacon terminal 13 by the server device 11 so that the maintenance staff can refer to the result. In this case, the portable device 12 receives the data indicating the result of the malfunction determination from the server device 11 and displays a check screen based on this data. The maintenance staff can check the operation status of the beacon terminal 13 disposed in the position measurement object area by moving in the position measurement object area while referring to the check screen displayed on the display device 37 of the portable device 12.

Figure 15:
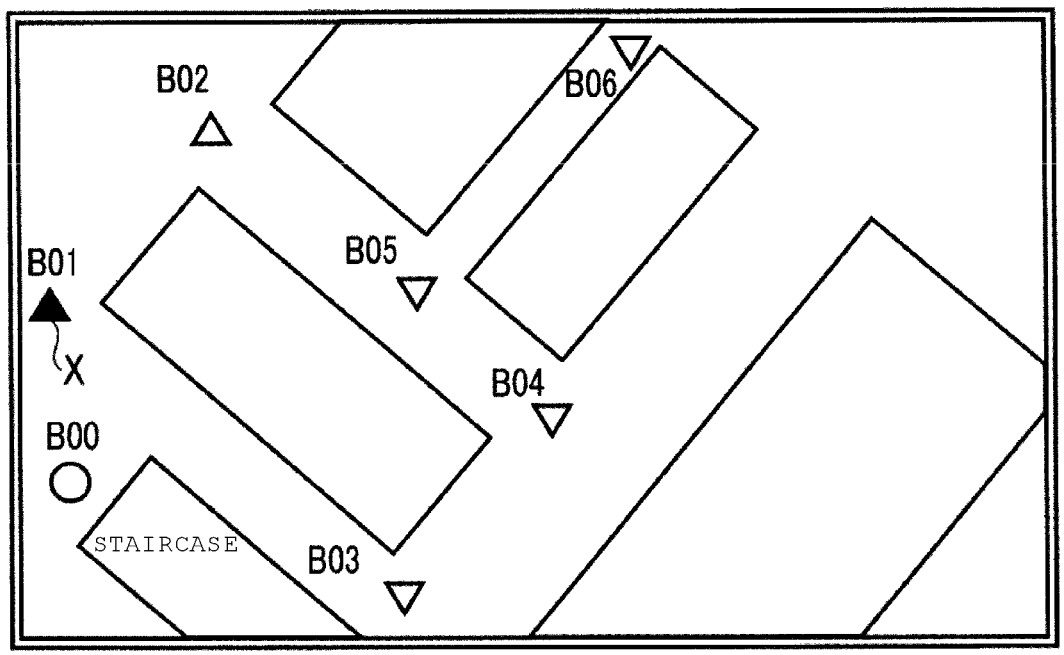
FIG. 15 is a diagram depicting an example of a check screen.

FIG. 15 is a diagram depicting an example of the check screen which is displayed on the display device 37 of the portable device 12. In FIG. 15, in a map image of part of the position measurement object area, which is an area to be checked, symbols representing the beacon terminals 13 (B00 to B06) installed in that area are displayed.

On the check screen which is displayed on the display device 37, for example, a symbol of the beacon terminal 13 on which a determination was made that the beacon terminal 13 is malfunctioning is displayed in a display form different from the display form used for the beacon terminal 13 on which a determination was made that the beacon terminal 13 is normal. In the example depicted in FIG. 15, a symbol X of the beacon terminal 13 represented as B01 is displayed in a display form different from the display form used for symbols of the other beacon terminals 13, so that the symbol X indicates that a determination was made that the beacon terminal 13 represented as B01 is malfunctioning. As a display form indicating the beacon terminal 13 on which a determination was made that the beacon terminal 13 is malfunctioning, for example, the color of a symbol of a beacon, the density of the color, or the shape or size of the symbol can be changed or the symbol of the beacon can be made to flash. Doing so allows the maintenance staff to visually and easily recognize that there is a high possibility that the beacon terminal 13 is malfunctioning. The maintenance staff can easily recognize a beacon terminal 13 whose operation should be checked from the map image.

Moreover, the density of the color of a symbol representing the beacon terminal 13, the size of the symbol, and the length of time between the flashes of the symbol may be changed based on a difference between the last reception time of the BLE reception information received from the beacon terminal 13 and the current time. For instance, the greater the difference between the last reception time and the current time, the smaller the distance between the beacons, and the smaller the value of the remaining battery level, the higher the density of the color of the symbol, the larger the size of the symbol, and the shorter the length of time between the flashes of the symbol. By so doing, the maintenance staff can easily recognize a beacon terminal 13 which should be preferentially checked from the plurality of beacon terminals 13.

In the second embodiment, if a nearby beacon is normal, there is a possibility that the movable bodies with the portable devices 12 do not pass by the beacon i. Thus, if the number of nearby beacons on which a determination was made that the nearby beacons were normal exceeds a threshold value, even when a determination is made that the difference between the current time and the last reception time u exceeds the time threshold value corresponding to the beacon identifier i, there is a high possibility that the beacon i is not malfunctioning. In this case, by displaying a symbol corresponding to the beacon i by using a color, a density of a color, a shape, a size, or a length of time between the flashes which is different from the color, the density, the shape, the size, or the length of time that is used for indicating that the beacon terminal 13 is malfunctioning, the maintenance staff may be urged to pay attention.

With such a configuration, the maintenance staff can check whether or not the beacon terminal 13 is operating.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Moreover, the processing described in the above-described embodiments can be provided to various devices by writing the processing, as a program which is executable by a computer, into recording media such as magnetic disks (a flexible disk, a hard disk, and so forth), optical disks (a CD-ROM, a DVD, and so forth), and semiconductor memory. Furthermore, the processing can also be provided to various devices as a program which is executable by a computer by transmitting the program by using a communication medium. The computer reads the program recorded on the recording medium or receives the program via the communication medium and executes the above-described processing as a result of the operation thereof being controlled by the program.

What is claimed is:

1. A server for use in a position measuring system that includes the server and a plurality of radio wave emitting stations positioned at different locations across a position measuring area, the server comprising:
   a communication interface configured to communicate with a plurality of portable devices that are moved through the position measuring area;
   a storage device that stores, for each of the plurality of radio wave emitting stations, a beacon identifier that uniquely identifies the radio wave emitting station in association with a first threshold time; and
   a processor configured to:
      acquire, from each of the portable devices via the communication interface, reception information including:
         a reception time indicating when the portable device received a beacon signal from one of the plurality of radio wave emitting stations, and
         a beacon identifier corresponding to the received beacon signal,
      determine for a first radio wave emitting station, first reception information that includes the beacon identifier corresponding to the first radio wave emitting station and that has most recently been acquired from any one of the portable devices, and
      determine that the first radio wave emitting station is not working properly when a difference between a current time and the reception time included in the first reception information exceeds the first threshold time associated with the first radio wave emitting station, and
      determine that the first radio wave emitting station is working properly when the difference does not exceed the associated first threshold time, and
      store in the storage device first information indicating whether the first radio wave emitting station is or is not working properly.

2. The server according to claim 1, wherein the processor is further configured to:
   acquire a maintenance result input for the first radio wave emitting station determined to be not working properly, and
   increase the first threshold value associated with the first radio wave emitting station if the maintenance result input indicates that the first radio wave emitting station was working properly.

3. The server according to claim 1, wherein
the storage device further stores, for each of the plurality of radio wave emitting stations, at least one neighbor beacon identifier that uniquely identifies a nearby radio wave emitting station, and
the processor is further configured to:
   determine for a second radio wave emitting station, second reception information that includes the beacon identifier corresponding to the second radio wave emitting station and that has most recently been acquired from any one of the portable devices, and
   when a difference between the current time and the reception time included in the second reception information exceeds the first threshold time associated with the second radio wave emitting station, determine whether the nearby radio wave emitting station is working properly based on the first information stored in the storage device, and
   when the nearby radio wave emitting station is working properly, determine that the second radio wave emitting station is not working properly.

4. The server according to claim 1, wherein
the storage unit further stores, for each of the plurality of radio wave emitting stations, coordinates indicating a position of the corresponding radio wave emitting station,
the processor is further configured to:
   determine for a third radio wave emitting station, third reception information that includes the beacon identifier corresponding to the third radio wave emitting station and that has most recently been acquired from any one of the portable devices, and
   when a difference between the current time and the reception time included in the third reception information exceeds the first threshold time associated with the third radio wave emitting station,
determine a nearby radio wave emitting station based on the coordinates stored in the storage unit,
determine the nearby beacon identifier is working properly based on the first information stored in the storage device, and
when the nearby radio wave emitting station is working properly, determine that the third radio wave emitting station is not working properly.

5. The server according to claim 1, wherein
the received reception information further includes a remaining level of a battery placed in the corresponding radio wave emitting station, and
the processor is further configured to:
determine for a fourth radio wave emitting station, fourth reception information that includes the beacon identifier corresponding to the fourth radio wave emitting station and that has most recently been acquired from any one of the portable devices, and determine that the fourth radio wave emitting station is not working properly when (i) a difference between the current time and the reception time included in the fourth reception information exceeds the first threshold time associated with the fourth radio wave emitting station, and (ii) the remaining level of the battery included in the fourth reception information is lower than or equal to a threshold level.

6. The server according to claim 1, wherein the processor is further configured to:
for each of the plurality of radio wave emitting stations determined to be not working properly generate second information indicating a relative magnitude of the difference between the current time and the reception time of the beacon signal that has most recently been acquired by any one of the portable devices.

7. The server according to claim 6, wherein the second information includes at least one of: relative density of a color of symbols corresponding to the radio wave emitting stations determined to be not working properly, relative size of the symbols, and a relative frequency of flashes of the symbols.

8. A method of using a position measuring system that includes a server and a plurality of radio wave emitting stations positioned at different locations across a position measuring area, the method comprising:
storing in a storage device, for each of the plurality of radio wave emitting stations, a beacon identifier that uniquely identifies the radio wave emitting station in association with a first threshold time;
receiving, from each of a plurality of portable devices, reception information including:
a reception time indicating when the portable device received a beacon signal from one of the plurality of radio wave emitting stations, and
a beacon identifier corresponding to the received beacon signal;
determining for a first radio wave emitting station, first reception information that includes the beacon identifier corresponding to the first radio wave emitting station and that has most recently been acquired from any one of the portable devices, and
determining that the first radio wave emitting station is not working properly when a difference between a current time and the reception time included in the first reception information exceeds the first threshold time associated with the first radio wave emitting station, and
determining that the first radio wave emitting station is working properly when the difference does not exceed the associated first threshold time; and
storing in the storage device first information indicating whether the first radio wave emitting station is or is not working properly.

9. The method according to claim 8, further comprising:
receiving a maintenance result input for the first radio wave emitting station determined to be not working properly, and
increasing the first threshold value associated with the first radio wave emitting station if the maintenance result input indicates that the first radio wave emitting station was working properly.

10. The method according to claim 8, further comprising:
storing in the storage device, for each of the plurality of radio wave emitting stations, at least one neighbor beacon identifier that uniquely identifies a nearby radio wave emitting station;
determining for a second radio wave emitting station, second reception information that includes the beacon identifier corresponding to the second radio wave emitting station and that has most recently been acquired from any one of the portable devices; and
when a difference between the current time and the reception time included in the second reception information exceeds the first threshold time associated with the second radio wave emitting station,
determining whether the nearby radio wave emitting station is working properly based on the first information stored in the storage device; and
when the nearby radio wave emitting station is working properly, determining that the second radio wave emitting station is not working properly.

11. The method according to claim 8, further comprising:
storing in the storage unit, for each of the plurality of radio wave emitting stations, coordinates indicating a position of the corresponding radio wave emitting station;
determining for a third radio wave emitting station, third reception information that includes the beacon identifier corresponding to the third radio wave emitting station and that has most recently been acquired from any one of the portable devices; and
when a difference between the current time and the reception time included in the third reception information exceeds the first threshold time associated with the third radio wave emitting station,
determining a nearby radio wave emitting station based on the coordinates stored in the storage unit;
determining the nearby beacon identifier is working properly based on the first information stored in the storage device; and
when the nearby radio wave emitting station is working properly, determining that the third radio wave emitting station is not working properly.

12. The method according to claim 8, wherein
the received reception information further includes a remaining level of a battery placed in the corresponding radio wave emitting station, and
the method further comprises:
determining for a fourth radio wave emitting station, fourth reception information that includes the beacon identifier corresponding to the fourth radio wave emitting station and that has most recently been acquired from any one of the portable devices, and determining that the fourth radio wave emitting station is not working properly when (i) a difference between the current time and the reception time included in the fourth reception information exceeds the first threshold time associated with the fourth radio wave emitting station, and (ii) the remaining level of the battery included in the fourth reception information is lower than or equal to a threshold level.

13. The method according to claim 8, further comprising: for each of the plurality of radio wave emitting stations determined to be not working properly generating second information indicating a relative magnitude of the difference between the current time and the reception time of the beacon signal that has most recently been acquired by any one of the portable devices.

14. The method according to claim 13, wherein the second information includes at least one of: relative density of a color of symbols corresponding to the radio wave emitting stations determined to be not working properly, relative size of the symbols, and a relative frequency of flashes of the symbols.

15. A non-transitory computer readable medium storing instructions causing a server to perform a method of using a position measuring system that includes the server and a plurality of radio wave emitting stations positioned at different locations across a position measuring area, the method comprising:
   storing in a storage device, for each of the plurality of radio wave emitting stations, a beacon identifier that uniquely identifies the radio wave emitting station in association with a first threshold time;
   receiving, from each of a plurality of portable devices, reception information including:
      a reception time indicating when the portable device received a beacon signal from one of the plurality of radio wave emitting stations, and
      a beacon identifier corresponding to the received beacon signal;
   determining for a first radio wave emitting station, first reception information that includes the beacon identifier corresponding to the first radio wave emitting station and that has most recently been acquired from any one of the portable devices, and
      determining that the first radio wave emitting station is not working properly when a difference between a current time and the reception time included in the first reception information exceeds the first threshold time associated with the first radio wave emitting station, and
      determining that the first radio wave emitting station is working properly when the difference does not exceed the associated first threshold time; and
   storing in the storage device first information indicating whether the first radio wave emitting station is or is not working properly.

16. The non-transitory computer readable medium according to claim 15, the method further comprising:
   receiving a maintenance result input for the first radio wave emitting station determined to be not working properly, and
   increasing the first threshold value associated with the first radio wave emitting station if the maintenance result input indicates that the first radio wave emitting station was working properly.

17. The non-transitory computer readable medium according to claim 15, the method further comprising:
   storing in the storage device, for each of the plurality of radio wave emitting stations, at least one neighbor beacon identifier that uniquely identifies a nearby radio wave emitting station;
   determining for a second radio wave emitting station, second reception information that includes the beacon identifier corresponding to the second radio wave emitting station and that has most recently been acquired from any one of the portable devices; and
   when a difference between the current time and the reception time included in the second reception information exceeds the first threshold time associated with the second radio wave emitting station,
      determining whether the nearby radio wave emitting station is working properly based on the first information stored in the storage device; and
      when the nearby radio wave emitting station is working properly, determining that the second radio wave emitting station is not working properly.

18. The non-transitory computer readable medium according to claim 15, the method further comprising:
   storing in the storage unit, for each of the plurality of radio wave emitting stations, coordinates indicating a position of the corresponding radio wave emitting station;
   determining for a third radio wave emitting station, third reception information that includes the beacon identifier corresponding to the third radio wave emitting station and that has most recently been acquired from any one of the portable devices; and
   when a difference between the current time and the reception time included in the third reception information exceeds the first threshold time associated with the third radio wave emitting station,
      determining a nearby radio wave emitting station based on the coordinates stored in the storage unit;
      determining the nearby beacon identifier is working properly based on the first information stored in the storage device; and
      when the nearby radio wave emitting station is working properly, determining that the third radio wave emitting station is not working properly.

19. The non-transitory computer readable medium according to claim 15, the method further comprising:
   for each of the plurality of radio wave emitting stations determined to be not working properly generating second information indicating a relative magnitude of the difference between the current time and the reception time of the beacon signal that has most recently been acquired by any one of the portable devices.

20. The non-transitory computer readable medium according to claim 19, wherein the second information includes at least one of: relative density of a color of symbols corresponding to the radio wave emitting stations determined to be not working properly, relative size of the symbols, and a relative frequency of flashes of the symbols.

* * * * *